N. B. MITCHELL & J. W. TAGGART, Sr.
PORTABLE SAW ENGINE.
APPLICATION FILED APR. 18, 1913.

1,160,938.

Patented Nov. 16, 1915.
4 SHEETS—SHEET 1.

WITNESSES:
J. H. Gardner.
M. L. Wilhelm.

INVENTORS:
Nelson B. Mitchell.
John W. Taggart, Sr.
By E. T. Silvius,
ATTORNEY.

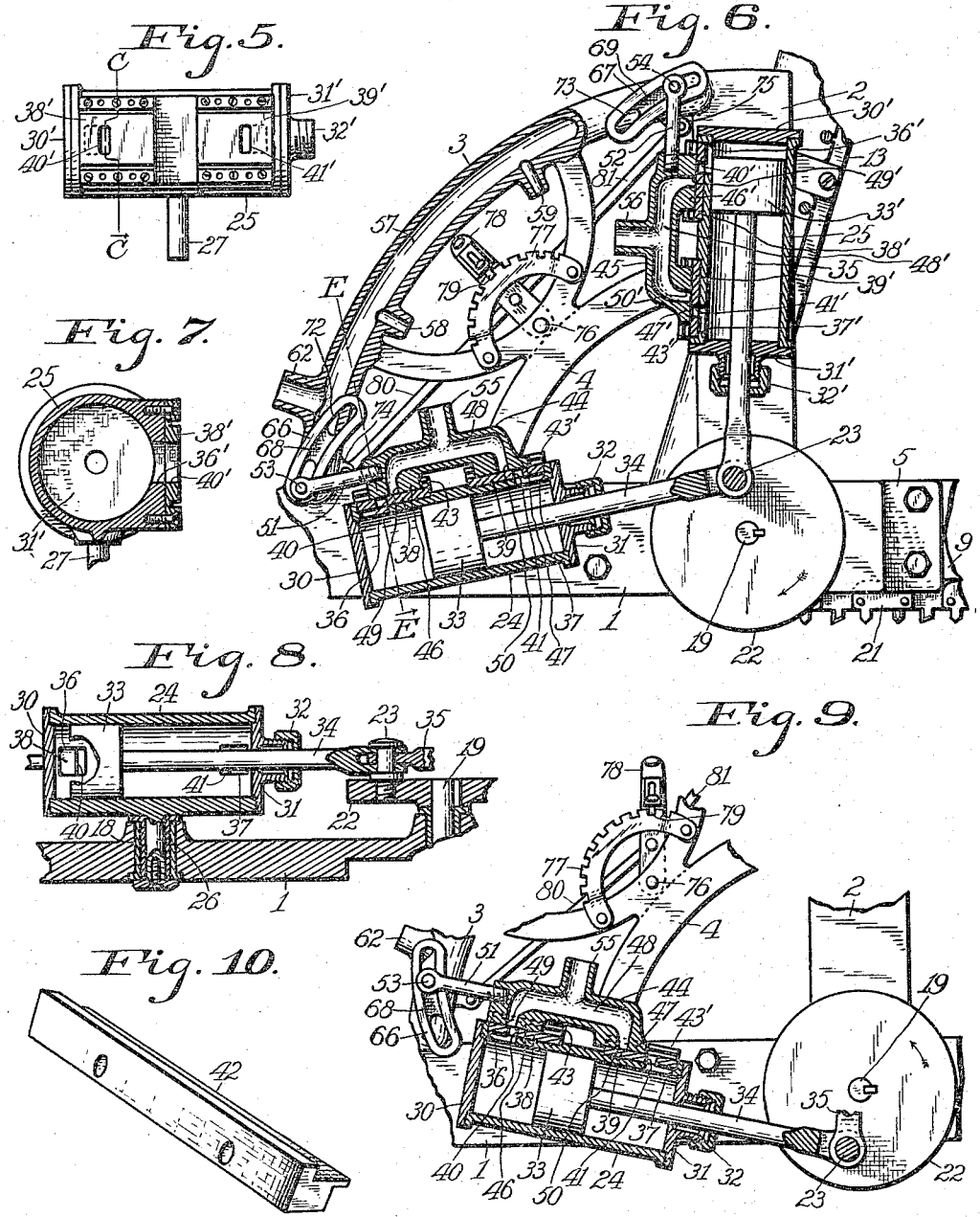

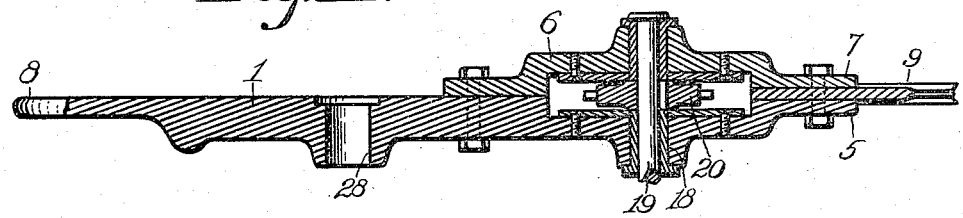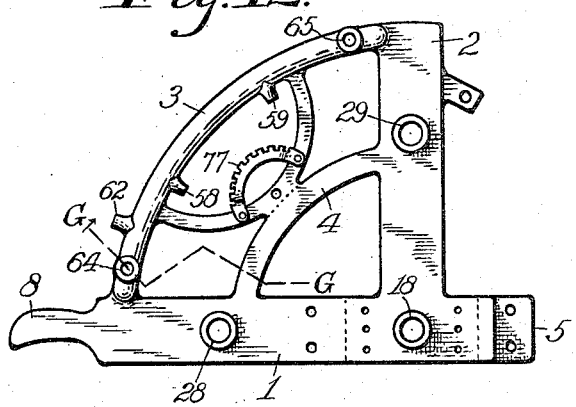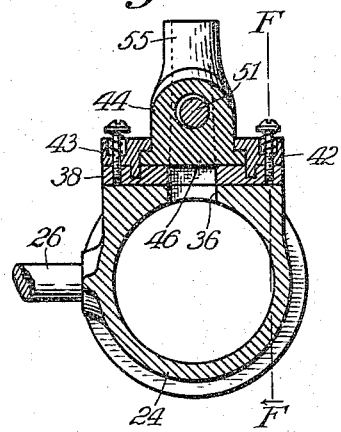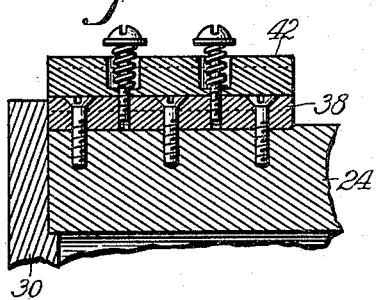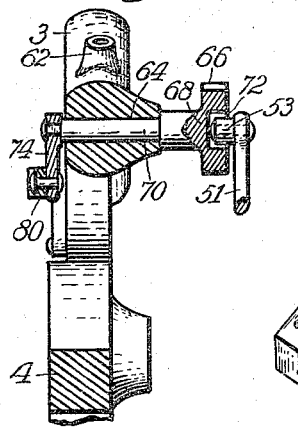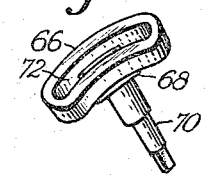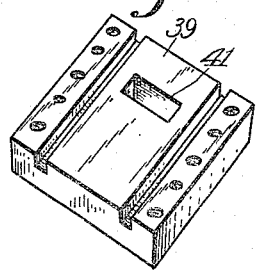

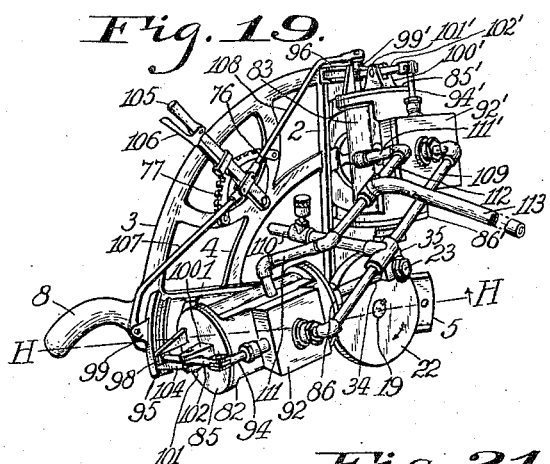
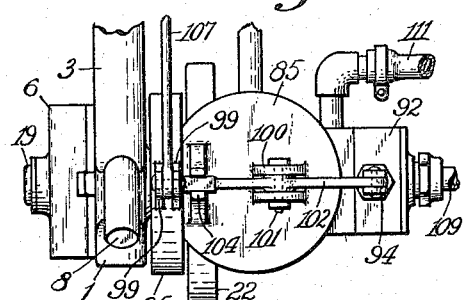
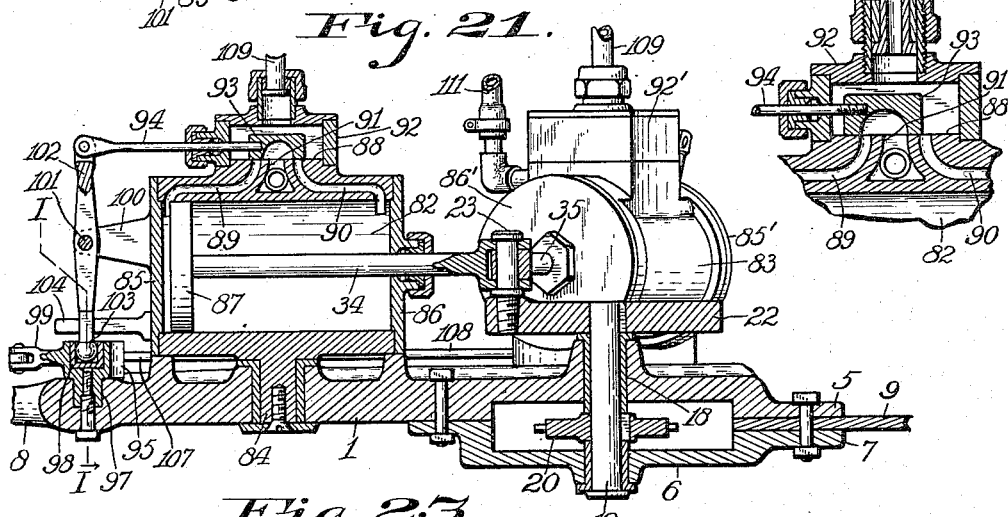
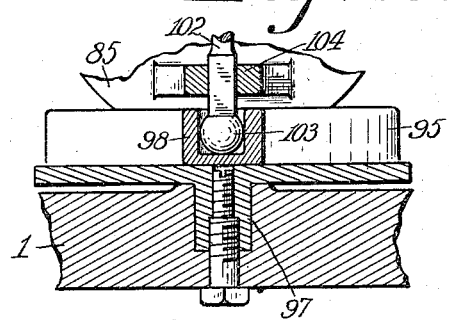
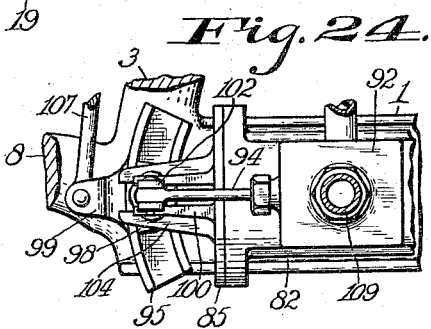

UNITED STATES PATENT OFFICE.

NELSON B. MITCHELL AND JOHN W. TAGGART, SR., OF INDIANAPOLIS, INDIANA, ASSIGNORS OF ONE-THIRD TO ULRICH G. REDELMANN, OF INDIANAPOLIS, INDIANA.

PORTABLE SAW-ENGINE.

1,160,938.  Specification of Letters Patent.  Patented Nov. 16, 1915.

Application filed April 18, 1913.  Serial No. 761,876.

*To all whom it may concern:*

Be it known that we, NELSON B. MITCHELL and JOHN W. TAGGART, Sr., citizens of the United States, residing at Indianapolis, in the county of Marion and State of Indiana, have invented a new and useful Portable Saw-Engine, of which the following is a specification, reference being had to the accompanying drawings and to the letters and figures of reference marked thereon.

This invention relates to fluid-pressure engines, particularly of the portable type adapted for use in connection with portable saws, the invention having reference more particularly to the valves and valve gearing for controlling the passage of the fluid to and from the engine cylinders.

An object of the invention is to provide an improved engine that shall be so constructed as to be adapted to be mounted on the frame of a chain saw for directly driving the saw.

A further object of the invention is to provide an improved oscillating engine that shall be simple and so constructed as to permit of reversing the direction of motion of the engine and vary the speed thereof, and which may be operated by means of either compressed air or steam.

A still further object of the invention is to provide a relatively small and powerful fluid-pressure engine of suitable construction for use in the forests, especially in the operations of felling timber, without requiring the services of expert attendants, and which shall be durable and economical in use.

With the above mentioned and other objects in view, the invention consists in an oscillating engine having novel controlling valves and reversing valve gearing, and in the novel parts and combinations and arrangements of parts as hereinafter particularly described and claimed.

Figure 1:
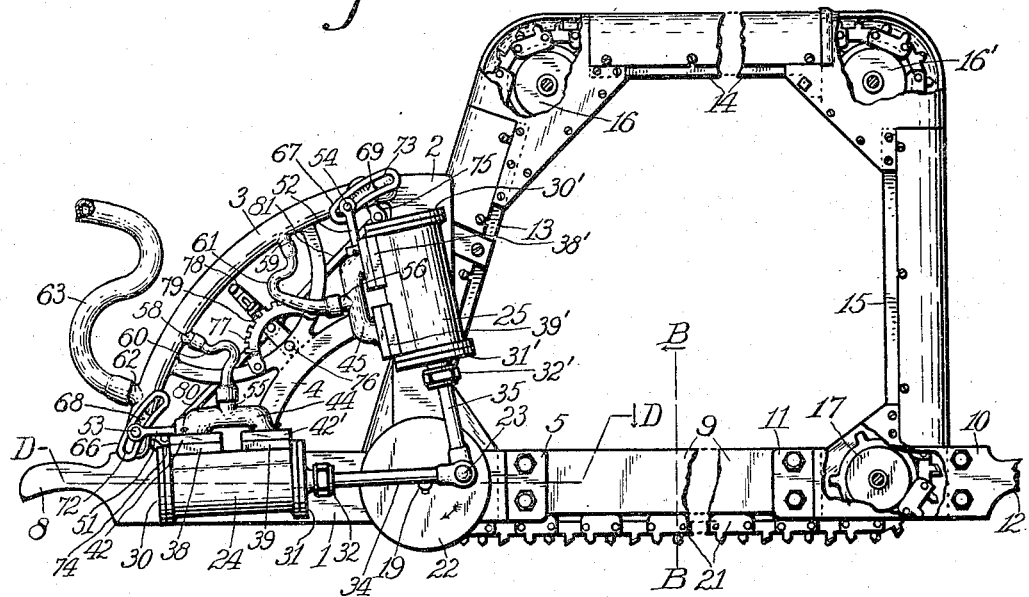
Figure 3:
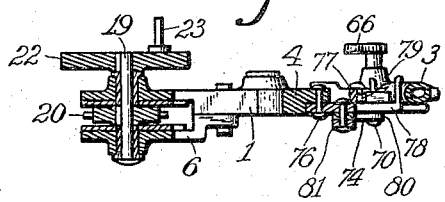
Figure 2:
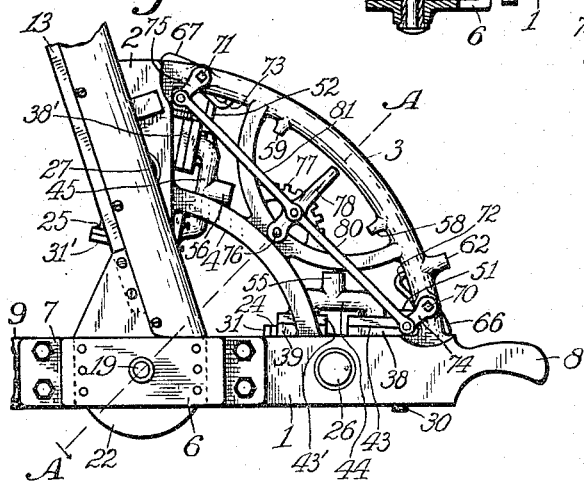
Figure 4:
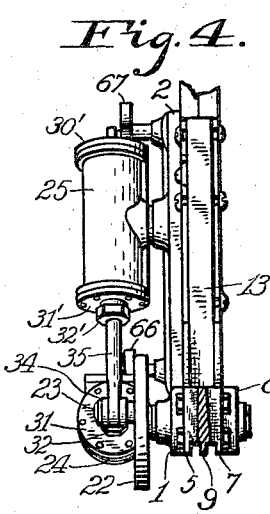

Referring to the drawings, Figure 1 is a plan of the improved engine mounted on a portable saw frame and shown in the position in which it may be used when felling a tree; Fig. 2 is a fragmentary plan of the reverse or normally under side of the engine; Fig. 3 is a fragmentary section approximately on the line A A in Fig. 2; Fig. 4 is a fragmentary sectional elevation approximately on the line B B in Fig. 1; Fig. 5 is an elevation of one of the engine cylinders; Fig. 6 is a plan of the engine frame and saw frame, the engine cylinders and valves being in central section; Fig. 7 is a transverse section approximately on the line C C in Fig. 5; Fig. 8 is a fragmentary section approximately on the line D D looking upward in Fig. 1; Fig. 9 is a fragmentary section reproducing a portion of Fig. 6 but showing the cylinder and valve in different positions; Fig. 10 is a perspective view of one of the valve guides; Fig. 11 is a fragmentary section on the line D D in Fig. 1 with the cylinder omitted; Fig. 12 is a plan of the engine frame; Fig. 13 is a fragmentary section approximately on the line E E in Fig. 6; Fig. 14 is a fragmentary section on the plane of the line F F in Fig. 13; Fig. 15 is a fragmentary section approximately on the line G G in Fig. 12 showing parts of the gearing connected with the engine frame; Fig. 16 is a perspective view of one of the reversing or shifting links of the valve gearing; Fig. 17 is a plan of one of the main valves; Fig. 18 is a perspective view of one of the valve seats; Fig. 19 is a perspective view of the engine slightly modified as to the arrangement of the main valves and the several parts of the valve gearing which are slightly modified; Fig. 20 is a fragmentary end view of the engine and frames; Fig. 21 is an enlarged section approximately on the line H H in Fig. 19; Fig. 22 is a sectional view showing portions of the preceding figure in relatively different position; Fig. 23 is a fragmentary section approximately on the line I I in Fig. 21; and Fig. 24 is a fragmentary plan of the improved valve gearing.

In the different figures of the drawings similar reference characters indicate like elements or features of construction herein referred to and described.

The improved engine frame preferably comprises a flat frame or bed plate suitably formed so as to be relatively light and strong and includes a main portion 1 and a portion 2 extending laterally from the portion 1, and also two brace bars 3 and 4 extending from the portion 1 and the portion 2. The frame has an ear 5 on one end thereof and also a removable side plate 6 having an ear 7 arranged opposite to the ear 5, the opposite end of the frame having a handle 8 thereon. A backing blade 9 for guiding a chain saw is secured at one end to the ears 5 and 7. The engine frame performs the function of a head stock for the saw. A suitable tail stock 10 is provided which has ears 11 secured to the opposite end of the blade 9 and it has also a handle 12. A guide member 13 is suitably secured to the engine frame or head stock and extends laterally therefrom at an acute angle to the backing blade 9; a guide member 14 extends from the member 13 parallel with the backing blade, and a guide member 15 extends from the member 14 to the tail stock 10 and is connected therewith so that a frame for a relatively long chain saw is provided in which guide wheels 16 and 16′ are mounted, another guide wheel 17 being mounted in the tail stock. The engine frame or head stock has a suitable aperture 18 therein in which a main shaft 19 is rotatably mounted. A driving wheel 20 is secured to the shaft between the portion 1 and the side plate 6, suitable space being provided, and a suitable chain saw 21 extends about the driving wheel and the said guide wheels so as to run in contact with the backing blade 9. The main shaft 19 has a crank disk 22 fixed thereon which is provided with a crank pin 23.

In the present case two cylinders 24 and 25 are employed and are substantially alike, the middle portion of the cylinders being provided respectively with trunnions 26 and 27 that are rotatively mounted in suitable bearings 28 and 29 respectively with which the engine frame is provided equi-distant from the main shaft 19. One cylinder has two heads 30 and 31 thereon, the other cylinder having heads 30′ and 31′ thereon, the heads 31 and 31′ being provided with packing boxes 32 and 32′ respectively. Pistons 33 and 33′ are fitted into the two cylinders respectively and are provided respectively with piston rods 34 and 35 that extend through the packing boxes and are connected to the crank pin 23 in such manner as to eliminate the dead-center in operation. The wall of one cylinder has two relatively long port openings 36 and 37 near the cylinder heads, the remaining cylinder having similar openings 36′ and 37′. One cylinder is preferably provided with two valve seats 38 and 39 formed separately and suitably secured to the exterior of the cylinder, the remaining cylinder being provided with similar valve seats 38′ and 39′. The valve seats 38 and 39 have ports 40 and 41 therein respectively that are somewhat shorter longitudinally of the cylinder than the openings 36 and 37 respectively, and are spaced so as to admit fluid to the opening at the end thereof farthest from the cylinder head, the fluid passing along the piston in the port opening to the opposite end of the opening when the piston is about to move away from the cylinder head. The remaining two valve seats have similar ports 40′ and 41′ therein arranged in a similar manner relative to the port openings 36′ and 37′. The several valve seats are provided with suitable guides 42 and 43, and 42′ and 43′ respectively, for guiding two main valves 44 and 45 of similar construction for the respective cylinders, one valve having two slide members 46 and 47 arranged on the valve seats 38 and 39 respectively, the remaining valve having two slide members 46′ and 47′ arranged on the seats 38′ and 39′ respectively. The valves have longitudinal chambers 48 and 48′ therein respectively, two ports 49 and 50 extending from the chamber 48 through the face of the slide members 46 and 47 respectively, two similar ports 49′ and 50′ extending from the chamber 48′ through the face of the slide members 46′ and 47′, for controlling the passage of the fluid through the ports that are in the valve seats. The valves are suitably maintained by their guides in close arrangement with the valve seats and are provided with valve stems 51 and 52 respectively, the ends of the stems having lateral wrist-pins 53 and 54 respectively for operating and controlling the valves. The relative proportion of the valves and the valve seats permits the slide members of the valves to move across the valve seats to such extent as to prevent the formation of shoulders or transverse ribs on either the valves or the seats, so that the natural wear does not necessitate frequent refacing. The valves are provided respectively with nipples 55 and 56 for conducting the fluid into the chambers of the valves. Preferably the bar 3 has a longitudinal chamber 57 formed in its middle portion with which is connected two nipples 58 and 59, and to the latter two rubber tubes 60 and 61 are connected which are connected also to the nipples 55 and 56 respectively for conducting the fluid to the moving valves. The bar 3 is provided also with a nipple 62 to which is connected a rubber supply pipe or hose 63 through which compressed air or steam may be conducted and distributed to the engine cylinders.

In order to advantageously support the valve gearing the engine frame is provided with two suitable apertures 64 and 65 which preferably are in the brace bar 3 adjacent to the portions 1 and 2 respectively of the engine frame. Two curved links 66 and 67 which are alike in form are provided for reversing the motion of the engine and to cause the main valves thereof to control the admission of the actuating fluid, such as compressed air, to the cylinders, the links being so constructed as to permit movable connection therewith of suitable devices connected with the valves. The links preferably are curved and the middle portions thereof provided with backs 68 and 69 respectively on which are trunnions 70 and 71 that are rotatively mounted in the bearings 64 and 65 respectively. The links preferably have longitudinal slots 72 and 73 therein respectively in which the wrist-pins 53 and 54 are respectively guided to cause relative movement as between the valves and the cylinders when the latter oscillate. The slots in the links preferably are curved concentrically to the axes of rotation of the trunnions of the cylinders. The links are provided with controlling arms 74 and 75 respectively for adjusting the links and holding them in fixed position when adjusted, the arms preferably being secured to the trunnions of the links. The engine frame is provided with a pivot 76 and also a notched quadrant 77, a reverse lever 78 being connected to the pivot and provided with a latch 79 adapted for engagement with the quadrant. A rod 80 is connected to the reverse lever and also to the arm 74, a similar rod 81 being connected also to the reverse lever and to the arm 75, so that when the engine is at rest the links may be shifted or adjusted on operation of the reverse lever for moving the valves and cause the engine to move either forward or backward as may be desired.

When the engine is constructed as above described, the main valves are on the adjacent side portions of the cylinders, so that both valves operate between the two cylinders, and the engine is best driven by means of compressed air which is exhausted from the cylinders through the ports of the valve seats into the atmosphere when the valves uncover the ports, as shown in Fig. 9 where the port 41 is uncovered.

In order to adapt the engine for the use of steam and control the exhaust so as to carry it away from the sawing machine and the attendants, the valve gearing is slightly modified as illustrated in Figs. 19 to 24 inclusive, in which are illustrated two cylinders 82 and 83 provided each with a trunnion 84 connecting the cylinders with the engine frame so as to oscillate, one cylinder having heads 85 and 86, the other having heads 85' and 86', each cylinder having a piston 87 therein connected respectively to the piston rods 34 and 35. Each cylinder has a valve seat 88 thereon from which ports 89 and 90 extend to opposite end portions of the cylinder and from which an exhaust port 91 also extends. The valve seats of the two cylinders are covered by steam chests 92 and 92' respectively in each of which a suitable valve operates and preferably is of the common D-valve type 93, the valves being provided respectively with valve stems 94 and 94'. Two slotted reversing links 95 and 96, similar to those above described, are provided each with a trunnion 97 rotatively mounted in the engine frame in proximity to the outer end of the cylinders. Each link has a socketed slide block 98 that is movable longitudinally in the slot of the link and guided therein. The links are provided respectively with controlling arms 99 and 99'. The heads 85 and 85' of the cylinders have arms 100 and 100' thereon respectively which support pivots 101, 101' respectively on which levers 102 and 102' are mounted between their ends, one end of the levers being pivotally connected to the valve stems 94 and 94' respectively and practically forming continuations thereof. Each lever has a ball 103 thereon that is inserted in the socket of the link block, and the lever is guided and prevented from wabbling on its supporting pivot by a guide 104 with which the adjacent cylinder head 85 or 85' is provided. A reverse lever 105 is connected to the frame substantially as herein-before described and has a latch 106 to coöperate with the quadrant 77 for holding the lever. A rod 107 is connected to the arm 99 and a similar rod 108 is connected to the arm 99', both rods being connected to the reverse lever.

In order to supply the valve chests 92 and 92' with steam, a pipe 109 is suitably swiveled at its ends to the tops of the two steam chests and it has a steam supply pipe 110 connected thereto, the arrangement being such that the pipe 109 is stationary when the cylinders oscillate. Two rubber tubes 111 and 111' are suitably connected with the exhaust ports of the two cylinders and are connected also to a metallic pipe 112 to which a rubber tube or hose 113 is connected for conducting away the exhaust steam.

In practical use the reversing links are held stationarily so as to be eccentric to the axes of oscillation of the cylinders, being so adjusted and held by means of the reverse lever and when the cylinders oscillate and therefore move the controlling devices of the main valves laterally, the devices travel longitudinally of the links in guiding connection therewith and cause the valves to move longitudinally on their seats so as to open or close the ports in the seats at the proper periods. In Fig. 6 it will be seen that the reverse lever is in mid position and the valves close all the ports. It will be evident that if the reverse lever be moved in one direction the valves will be shifted so that the engine will start in one direction, and if the lever be moved in the opposite direction the valves will be shifted so that the engine will start and move in the opposite direction. Normally the engine runs in the direction indicated by arrows on Figs. 1, 6 and 19, but in case it becomes necessary to back the saw the engine may be reversed so as to run in the opposite direction as indicated in Fig. 9. Other results of the operation of the engine will be readily understood from the foregoing description of the construction and arrangement of the various parts thereof.

Having thus described the invention, what is claimed as new is—

1. In a portable saw engine, the combination of a frame, two cylinders spaced apart and mounted to oscillate on the frame, a crank shaft rotatably mounted in the frame, two pistons in the cylinders respectively and operatively connected with the crank shaft, two guide links supported on the frame in proximity to the ends of the cylinders that are the farther from the crank shaft, two valves movable on the cylinders respectively for admitting fluid to the cylinders, and two controlling devices connected to the valves respectively and having sliding contact with the links respectively.

2. In a portable saw engine, the combination with a frame, of a cylinder mounted to oscillate on one portion of the frame, a second cylinder mounted to oscillate on another portion of the frame, two links mounted adjustably on the frame, a lever pivotally connected to the frame, two rods connected with the two links respectively and also with the lever, and two movable valves for controlling admission of fluid to the two cylinders respectively and operatively connected with the two links respectively.

3. In a portable saw engine, the combination of a frame having a fluid-retaining chamber therein, two cylinders mounted to oscillate on the frame, two links mounted adjustably on the portion of the frame that has the chamber therein, a lever pivoted to the frame, two rods connected to the two links respectively and also to the lever, two movable valves for controlling admission of fluid to the two cylinders respectively and operatively connected with the two links respectively, each valve being guided on its cylinder and having a fluid-retaining chamber therein, and two laterally flexible pipes connected to the two valves respectively and also with the chamber of said frame.

4. In a portable saw engine, the combination of a frame, two cylinders mounted to oscillate on the frame, each cylinder having two ports, two valves movable on the cylinders respectively for opening or closing the ports thereof, two links mounted adjustably on said frame, each link having a controlling arm, two operating connections connected respectively with the two valves and movably with the two links, a lever pivotally connected with the said frame, a notched quadrant fixedly supported by said frame adjacent to said lever, a latch mounted on said lever for engaging said quadrant, a rod connected to the lever and also to the controlling arm of one of said links, and a rod connected also to said lever and to the arm of the remaining one of said links.

5. In a portable saw engine, the combination of a frame, a crank shaft rotatably mounted in the frame, a cylinder having a trunnion rotatably mounted in said frame, a piston movable in said cylinder, a pitman connected to the piston and the crank shaft, a valve movable on the cylinder for controlling admission of fluid to the cylinder, a guide link having a trunnion that is rotatably adjustable in the said frame, an arm fixed on the trunnion of said link, a controlling rod pivotally connected to said arm, and an operating connection for said valve connected with the valve and also movably connected with said link.

6. In a portable saw engine, the combination of a frame, a power cylinder mounted to oscillate on the frame, a valve movable on the cylinder, a stem connected to the valve, a guide link mounted on the frame, an arm and a guide fixedly connected to the cylinder, the guide being adjacent to the link, and a lever pivoted between its ends to the arm and connected at one end to said stem, the opposite end portion of the lever being in movable contact with said guide and also with said link.

In testimony whereof, we affix our signatures in presence of two witnesses.

NELSON B. MITCHELL.
JOHN W. TAGGART, Sr.

Witnesses:
  E. T. Silvius,
  M. L. Wilhelm.